US010536514B2

(12) United States Patent
Huang et al.

(10) Patent No.: US 10,536,514 B2
(45) Date of Patent: Jan. 14, 2020

(54) METHOD AND APPARATUS OF PROCESSING RETRANSMISSION REQUEST IN DISTRIBUTED COMPUTING

(71) Applicant: Alibaba Group Holding Limited, Grand Cayman (KY)

(72) Inventors: Yicong Huang, Hangzhou (CN); Chaoqun Zhan, Hangzhou (CN); Yue Pan, Hangzhou (CN); Xiang Zhou, Hangzhou (CN); Yujun Liao, Hangzhou (CN); Jiannan Ji, Hangzhou (CN)

(73) Assignee: Alibaba Group Holding Limited, Cayman Islands (KY)

( * ) Notice: Subject to any disclaimer, the term of this patent is extended or adjusted under 35 U.S.C. 154(b) by 383 days.

(21) Appl. No.: 15/003,684

(22) Filed: Jan. 21, 2016

(65) Prior Publication Data

US 2016/0219100 A1 Jul. 28, 2016

(30) Foreign Application Priority Data

Jan. 22, 2015 (CN) .......................... 2015 1 0032434

(51) Int. Cl.
*G06F 15/16* (2006.01)
*H04L 29/08* (2006.01)
(Continued)

(52) U.S. Cl.
CPC ...... *H04L 67/1002* (2013.01); *H04L 67/2842* (2013.01); *H04L 1/08* (2013.01); *H04L 1/18* (2013.01)

(58) Field of Classification Search
USPC ....................................................... 709/201
See application file for complete search history.

(56) References Cited

U.S. PATENT DOCUMENTS 7,359,919 B2 4/2008 Cohen et al.
7,493,394 B2 2/2009 Zavalkovsky et al.
(Continued)

FOREIGN PATENT DOCUMENTS

CN 101009535 A 8/2007
CN 103036717 A 4/2013
WO WO0113228 2/2001

OTHER PUBLICATIONS

PCT Search Report and Written Opinion dated Mar. 31, 2016 for PCT Application No. PCT/US16/14364, 8 pages.
(Continued)

*Primary Examiner* — Alicia Baturay
(74) *Attorney, Agent, or Firm* — Lee & Hayes, P.C.

(57) ABSTRACT

A method and an apparatus for processing a retransmission request in distributed computing are disclosed. The method includes obtaining a retransmission request to be processed in distributed computing; determining a target copy partition corresponding to the retransmission request based on respective partition response time information of individual copy partitions; sending the retransmission request to the target copy partition. Compared with existing technologies, the present disclosure distinguishes each partition with one another based on a partition response time of the respective copy partition to determine a target copy partition corresponding to a retransmission request, thus selecting a copy with a better response time during retransmission, reducing a response time for the retransmission request and reducing an overall load of an associated cluster.

18 Claims, 6 Drawing Sheets

(51) Int. Cl.
   *H04L 1/08* (2006.01)
   *H04L 1/18* (2006.01)

(56) References Cited

U.S. PATENT DOCUMENTS

| | | | | |
|---|---|---|---|---|
| 7,746,772 B2* | 6/2010 | Makino | ................. | G06F 9/4881 |
| | | | | 370/229 |
| 7,937,619 B2 | 5/2011 | Little | | |
| 7,953,787 B2 | 5/2011 | Potter et al. | | |
| 8,260,956 B2* | 9/2012 | Reyhner | ................. | G06F 9/546 |
| | | | | 709/223 |
| 8,683,467 B2* | 3/2014 | Bingham | ............ | G06F 9/45533 |
| | | | | 718/1 |
| 8,904,389 B2* | 12/2014 | Bingham | ............ | G06F 9/45533 |
| | | | | 718/1 |
| 9,164,786 B2* | 10/2015 | Bingham | ............ | G06F 9/45533 |
| 9,430,280 B1* | 8/2016 | Shih | ........................ | G06F 9/485 |
| 9,495,187 B2* | 11/2016 | Bingham | ............ | G06F 9/45533 |
| 9,720,732 B1* | 8/2017 | Shih | ........................ | G06F 9/4887 |
| 2007/0168861 A1* | 7/2007 | Bell | ........................ | G06F 3/0481 |
| | | | | 715/701 |
| 2009/0037515 A1 | 2/2009 | Zapata et al. | | |
| 2012/0124431 A1 | 5/2012 | Bauer et al. | | |
| 2012/0209901 A1 | 8/2012 | Xu et al. | | |
| 2012/0221669 A1* | 8/2012 | Hashimoto | ............. | H04L 69/40 |
| | | | | 709/212 |
| 2013/0247044 A1 | 9/2013 | Bingham et al. | | |
| 2013/0318297 A1 | 11/2013 | Jibbe et al. | | |
| 2014/0059312 A1* | 2/2014 | Uno | ........................ | G06F 3/0655 |
| | | | | 711/162 |
| 2014/0089619 A1* | 3/2014 | Khanna | ................. | G06F 16/273 |
| | | | | 711/166 |
| 2014/0173047 A1 | 6/2014 | Crowder et al. | | |
| 2014/0379846 A1 | 12/2014 | Kanuri et al. | | |
| 2015/0186228 A1 | 7/2015 | Kumar | | |
| 2016/0128059 A1* | 5/2016 | Hsu | ........................ | H04W 76/18 |
| | | | | 370/336 |

OTHER PUBLICATIONS

First Search Report dated Sep. 7, 2018 by the State Intellectual Property Office of the People's Republic of China in corresponding Application No. CN 201510032434 (2 pages).
First Office Action dated Sep. 18, 2018 by the State Intellectual Property Office of the People's Republic of China in corresponding Application No. CN 201510032434 (6 pages).
English-language translation of First Office Action dated Sep. 18, 2018 by the State Intellectual Property Office of the People's Republic of China in corresponding Application No. CN 201510032434 (8 pages).
Second Chinese Office Action dated May 24, 2019 for Chinese Application No. 2015100324344, 7 pages.
Chinese Supplementary Search Report dated May 15, 2019 for Chinese Patent Application No. 2015100324344.

* cited by examiner

METHOD AND APPARATUS OF PROCESSING RETRANSMISSION REQUEST IN DISTRIBUTED COMPUTING

CROSS REFERENCE TO RELATED PATENT APPLICATION

This application claims foreign priority to Chinese Patent Application No. 201510032434.4 filed on Jan. 22, 2015, entitled "Method and Apparatus of Processing Retransmission Request in Distributed Computing", which is hereby incorporated by reference in its entirety.

TECHNICAL FIELD

The present disclosure relates to the field of computers, and in particular, to the technology of processing a retransmission request in distributed computing.

BACKGROUND

In distributed computing, an intensive computation task may sometimes need to be divided into a plurality of subtasks, and each subtask is distributed to a plurality of computation nodes for processing. After the computation nodes complete the processing, computation results of the subtasks are fed back and summarized as a final computation result. An execution condition of the intensive computation task depends on an execution time of the slowest subtask. If an execution time of a subtask is much longer than that of other subtasks, a throughput and a request response time of the entire distributed system will be affected, which is known as a long tail phenomenon in distributed computing.

Currently, existing technologies mainly adopt a simple task retransmission approach to compensate an impact of a long tail associated with time consumption of an overall computation task for the long tail phenomenon. However, in practice, a redistributed task often cannot be quickly completed at this point, and thereby such simple task retransmission cannot effectively relieve the long tail phenomenon in distributed computing.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An objective of the present disclosure is to provide a method and an apparatus for processing a retransmission request in distributed computing.

According to an aspect of the present disclosure, a method for processing a retransmission request in distributed computing is provided, which may include obtaining a retransmission request to be processed in distributed computing, wherein the distributed computing involves at least one data copy and each data copy includes one or more copy partitions; determining a target copy partition corresponding to the retransmission request based on respective partition response time information of the copy partitions; and transmitting the retransmission request to the target copy partition.

According to another aspect of the present disclosure, an apparatus for processing a retransmission request in distributed computing is further provided, which may include a first apparatus used for obtaining a retransmission request to be processed in distributed computing, wherein the distributed computing involves at least one data copy and each data copy includes one or more copy partitions; a second apparatus used for determining a target copy partition corresponding to the retransmission request based on respective partition response time information of the copy partitions; and a third apparatus used for transmitting the retransmission request to the target copy partition.

As compared with existing technologies, the present disclosure distinguishes each partition from one another using a respective partition response time of each copy partition, thereby determining a target copy partition corresponding to a retransmission request, which can preferentially select a copy with a better response time in retransmission, and reduce a response time of the retransmission request and decrease an overall load of a cluster. Furthermore, the present disclosure introduces predetermination of retransmission. The retransmission request is transmitted to the target copy partition only when the retransmission request satisfies a condition for request retransmission. In application scenarios such as heavy-load clusters and skewed partitions, a retransmission request may be abandoned because the latest response time of a partition requested for retransmission has been relatively long, thus avoiding potentially useless retransmission to reduce an actual load of the cluster. In addition, with respect to an initial transmission request to be processed in distributed computing, the present disclosure may further select a copy partition corresponding to the initial transmission request based on information of a respective partition response speed of each copy partition, i.e., select an relatively optimal partition for the request at issue when the request is transmitted for the first time, thereby reducing the probability of retransmission to the greatest extent at a source level.

DESCRIPTION OF THE DRAWINGS

By reading a detailed description of non-limiting embodiments in view of accompanying drawings as follows, other characteristics, objectives and advantages of the present disclosure will become clearer.

DETAILED DESCRIPTION

The present disclosure will be further described in detail hereinafter in combination with the accompanying drawings.

In a typical configuration for the present disclosure, a terminal, an apparatus and a trusted party of a service network each include one or more processors (CPUs), I/O interfaces, network interfaces, and memory.

The memory may include a form of computer-readable media, e.g., a non-permanent storage device, random-access memory (RAM) and/or a nonvolatile internal storage, such as read-only memory (ROM) or flash RAM. The memory is an example of computer-readable media. The memory may include one or more program units and program data.

The computer-readable media may include a permanent or non-permanent type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

Figure 1:
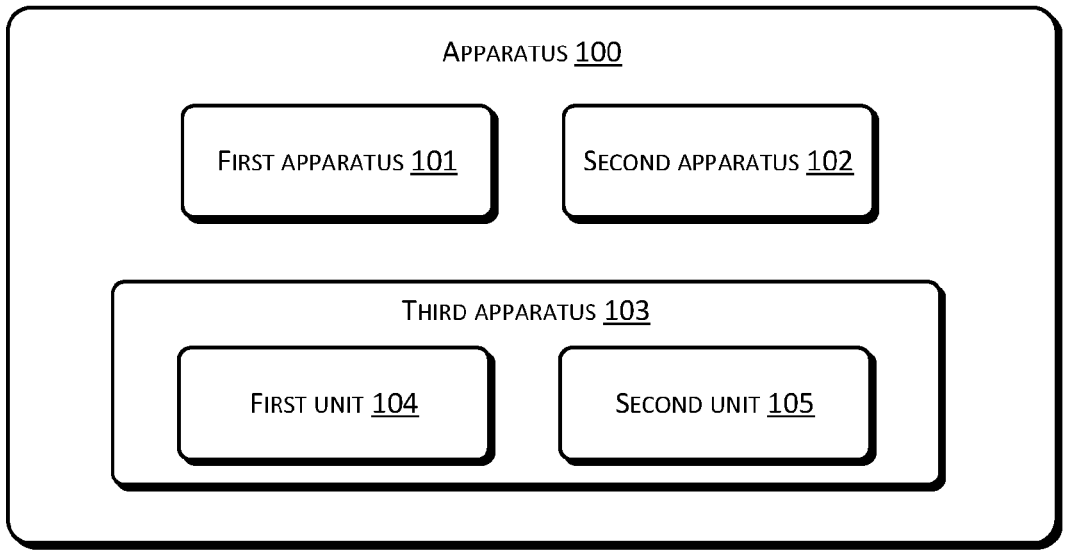
FIG. 1 shows a schematic diagram of an apparatus for processing a retransmission request in distributed computing according to an aspect of the present disclosure.

FIG. 1 shows a schematic diagram of an apparatus 100 for processing a retransmission request in distributed computing according to an aspect of the present disclosure. In implementations, the apparatus 100 may include a first apparatus 101, a second apparatus 102 and a third apparatus 103.

The first apparatus 101 is used for acquiring a retransmission request to be processed in distributed computing, wherein the distributed computing relates to at least one data copy and each data copy includes one or more copy partitions; the second apparatus 102 is used for determining a target copy partition corresponding to the retransmission request based on partition response time information of the copy partitions; and the third apparatus 103 is used for transmitting the retransmission request to the target copy partition.

Specifically, the first apparatus 101 of the apparatus 100 acquires a retransmission request to be processed in distributed computing. The distributed computing involves at least one data copy and each data copy includes one or more copy partitions. In distributed computing, solving a task request issued by a user often needs a huge amount of computing capability. In this case, such complex parent request is divided into a plurality of child requests. The plurality of child requests are then separately sent by a server to a plurality of computation nodes of a distributed cluster for processing. All computation results are returned and summarized after the processing is completed by the computation nodes. Multiple copies of data may exist in the distributed cluster. Each copy of data includes a complete set of data that is needed in distributed computing. Each copy of data is further divided into multiple copy partitions. Each copy partition includes partial data in a corresponding copy of data. In implementations, partitions corresponding to each copy of data are divided consistently. For example, data copy 1 and data copy 2 may exist in the system simultaneously. The two copies of data are respectively divided into M partitions, and data distributed in corresponding partitions are the same. For example, a partition 1 of the data copy 1 and a partition 1 of the data copy 2 are consistent, a partition 2 of the data copy 1 and a partition 2 of the data copy 2 are consistent, and so on. The distributed cluster may be formed by a plurality of servers. Each server is a computation node, which may store one or more pieces of partition data. Respective devices corresponding to partitions of data copy may be located in a same device room or may be deployed across multiple device rooms. Devices corresponding to multiple data copies may also be simultaneously deployed in a single device room.

Some common problems in a distributed cluster, such as cross-room network delay, device transient fault, device hardware difference and data fragmentation unevenness, etc., may cause an imbalance in response times of computation nodes. At this point, a child request for which a response is not made timely is defined as a long-tail request, i.e., a retransmission request to be processed. The retransmission request to be processed can be acquired based on a defined ratio time, i.e., retransmitting a task needs to be initiated when the target request exceeds a predefined ratio time. Alternatively, a determination may be made as to whether to start to retransmit the task when results are returned by a certain proportion of partitions. For example, a parent request is divided into 100 target child requests, which correspond to 100 partitions. When 30% of partitions return requested results and the remaining requests are still in a process of execution, a determination may be made to start to retransmit the remaining tasks which are still in the process of execution to acquire retransmission requests.

The second apparatus 102 of the apparatus 100 determines a target copy partition corresponding to the retransmission request based on the information of respective partition response times of the copy partitions. Based on redundant copy partitions in the system, a copy partition may be reselected for transmitting the retransmission request. Such copy partition has corresponding data information that is needed by the retransmission request. In implementations, the division of partitions corresponding to each data copy is consistent. Therefore, the retransmission request is able to match with a corresponding partition of each copy. Generally, a difference exists between the same partitions of different copies in terms of a response condition with respect to a same retransmission request. For example, two copy partitions may exist for a retransmission request A at the same time. A partition 3 of a copy 1 and a partition 3 of a copy 2 both include requested data corresponding to the retransmission request A. However, due to reasons such as data load at this point, differences among devices corresponding to the two copy partitions or an existence of failure on a device corresponding to one of the copy partitions, actual request-response effects of the two copy partitions with respect to the retransmission request A may be different. In order to complete the entire computation more effectively, a copy partition having a better response effect may be preferentially selected as a target copy partition of the retransmission request A. In implementations, the target copy partition corresponding to the retransmission request is determined based on the information of respective partition response times of the copy partitions. Information of a partition response time may include partition information which is acquired through analysis and computation based on data such as response times of past requests and real-time requests received by an associated partition. Generally, the copy partition with the better response effect may be selected by comparing the information of the respective partition response times of the copy partitions with one another. In implementations, in distributed computing, each copy partition may accept a large number of different data requests in each period of time. As such, a data load of the partition continuously changes. Thus, information of a partition response time of each copy partition cannot stay unchanged and needs to be updated in real time. In the present disclosure, the past requests or real-time requests based on which an update is performed include an initial transmission request and a retransmission request of a certain data request. Furthermore, the system may set up an update period such as, after every time interval T, to update corresponding partition response time information. Additionally or alternatively, corresponding partition response time information may also be updated based on response times of the real-time requests. Additionally or alternatively, more reasonable partition response time information may be acquired by performing a weight calculation to the response times of the past requests and the real-time requests. Furthermore, when a corresponding target copy partition needs to be selected for a retransmission request, a screening may be performed based on information of a respective partition response time corresponding to each copy partition at this point to acquire a final target copy partition.

One skilled in the art should understand that the above approach of determining a target copy partition corresponding to a retransmission request based on information of respective partition response times of copy partitions is used for an exemplary purpose. Other existing or later available methods of determining a target copy partition corresponding to a retransmission request, if applicable to the present disclosure, shall also be included in the scope of protection of the present disclosure, and are incorporated herein by reference.

The third apparatus 103 of the apparatus 100 transmits the retransmission request to the target copy partition. Upon determining the target copy partition corresponding to the retransmission request, the requested task may be further retransmitted to a new copy partition and wait for information returned by the new copy partition. In the present disclosure, the distributed computing may include real-time computation and non-real-time computation. Particularly, when the distributed computing is non-real-time computation, an order of magnitude associated with a time for performing the task is relatively large, which may be, for example, minutes, hours, or even longer. If a result of a first retransmission is not ideal at this point, a second retransmission, a third retransmission, etc., may be continuously performed according to the present disclosure within an allowable range of performance overhead. In addition, a predetermination for retransmission may be carried out for the target copy partition before sending a retransmission request. A purpose thereof is to abandon useless retransmission and to reduce an overall actual load of a cluster in scenarios such as occurrences of heavy-load clusters and skewed partitions.

In existing technologies, a retransmission request is sent to different copies with the same probability for the long tail phenomenon. At this point, retransmitting a task is based on two premises: one is that a retransmission request is responded more preferentially than the original request by default assumption; and the other is that the performance overhead caused by the retransmission request is low, which does not affect other requests in normal processing. However, in real computation, such premises are not always established. For example, when the entire cluster is in a heavy-load state, a relatively long time still needs to be taken to respond to a retransmission request if a device which accepts the retransmission request is already in the heavy-load state. At this point, the retransmission cannot improve the cluster's response time but increases the burden of the cluster. For another example, if a data partition on which a computation task depends is skewed, such as unevenness in data partitioning, a skew in data access and the like, at this point, response times of corresponding partitions in all copies for a retransmission request are long, thus failing to facilitate task retransmission. Furthermore, if a copy corresponding to a computation task is skewed due to reasons such as time delay differences in network accesses, differences in devices, hardware faults and the like, equivalent copies including the same data in the distributed cluster may also have differences in response times even though the load is the same. These scenarios cause obvious deficiencies in the applicability of the existing technologies, which cannot solve the long tail problem.

Compared with the existing technologies, the present disclosure distinguishes individual partitions according to partition response times of the copy partitions to determine a target copy partition corresponding to a retransmission request, thus enabling a better selection of a copy with a better response time in retransmission, and reducing a response time of the retransmission request and an overall load of a cluster to optimize an overall distributed computing.

In implementations, the third apparatus 103 of the apparatus 100 may include a first unit 104 and a second unit 105. The first unit 104 detects whether the retransmission request satisfies a request retransmission condition. The second unit 105 sends the retransmission request to the target copy partition in response to the retransmission request satisfying the request retransmission condition.

In implementations, with respect to the obtained retransmission request, an optimal target copy partition corresponding to the retransmission request is determined based on the respective partition response time of each copy partition. However, sometimes, the cluster computation may not be optimized in reality when the retransmission is completed in the target copy partition. For example, when the entire cluster is in the heavy-load state or when the data partition on which the computation task depends is skewed such as an unevenness in data partitioning, a skew in data accesses, etc., partition response times in all the copies for the corresponding retransmission request are relatively long, which fails to facilitate task retransmission. In this case, abandoning the retransmission request may be selected to avoid possible useless retransmission and thus reduce an actual load of the cluster. In implementations, a corresponding request retransmission condition may be set up based on an overload situation that potentially exists for a copy partition corresponding to the task request. The first unit 104 of the third apparatus 103 may detect whether the retransmission request satisfies the set request transmission condition. If the request retransmission condition is not satisfied, an overload protection is activated, i.e., a determination is made that the corresponding target copy partition is overloaded, and the retransmission is abandoned. If the retransmission request satisfies the request retransmission condition, a determination is made to perform an operation for the retransmission, and the second unit 105 sends the retransmission request to the target copy partition.

In implementations, the first unit 104 may determine whether the retransmission request satisfies the request retransmission condition based on partition response time information of the target copy partition and a maximum timeout time corresponding to the retransmission request.

By way of example and not limitation, a determination of whether the retransmission request satisfies the request retransmission condition may be made based on information of a partition response time of the target copy partition corresponding to the retransmission request and a maximum timeout time corresponding to the retransmission request in the target copy partition. A maximum timeout time corresponds to the maximum time allowed by a request to wait for a response in a partition. In implementations, in distributed computing, maximum timeout times corresponding to child requests from the same parent request are consistent, and child requests from different parent requests may correspond to different maximum timeout times. A difference between the set maximum timeout times may be based on a difference between sources corresponding to task requests. A predetermination may be made for the retransmission request based on the maximum timeout time corresponding to the retransmission request and the information of the partition response time of the target copy partition. For example, if the maximum timeout time corresponding to the retransmission request in the copy partition is T, and the information of the partition response time for the current target copy partition is score, a determination may be made that the request retransmission condition is not satisfied and the overload protection is activated when score<T×a (a is a floating-point number between 0 and 1). For example, when a is 0.5, if the partition response time information, score, is smaller than half of the request maximum timeout time of the copy partition at this point, for example, this indicates that a longer time may be needed to respond to the request that is sent to the target copy partition due to the heavy load of a device corresponding to the target copy partition, and the retransmission may be abandoned in this case. Otherwise, this may indicate that the request retransmission condition is satisfied and therefore the retransmission request may be sent to the target copy partition.

One skilled in the art should understand that the above approach of determining whether a retransmission request satisfies a request retransmission condition is used for an exemplary purpose only. Other existing or future methods of determining whether a retransmission request satisfies a request retransmission condition, if applicable to the present disclosure, shall also be included in the scope of protection of the present disclosure, and are incorporated herein by reference.

Figure 2:
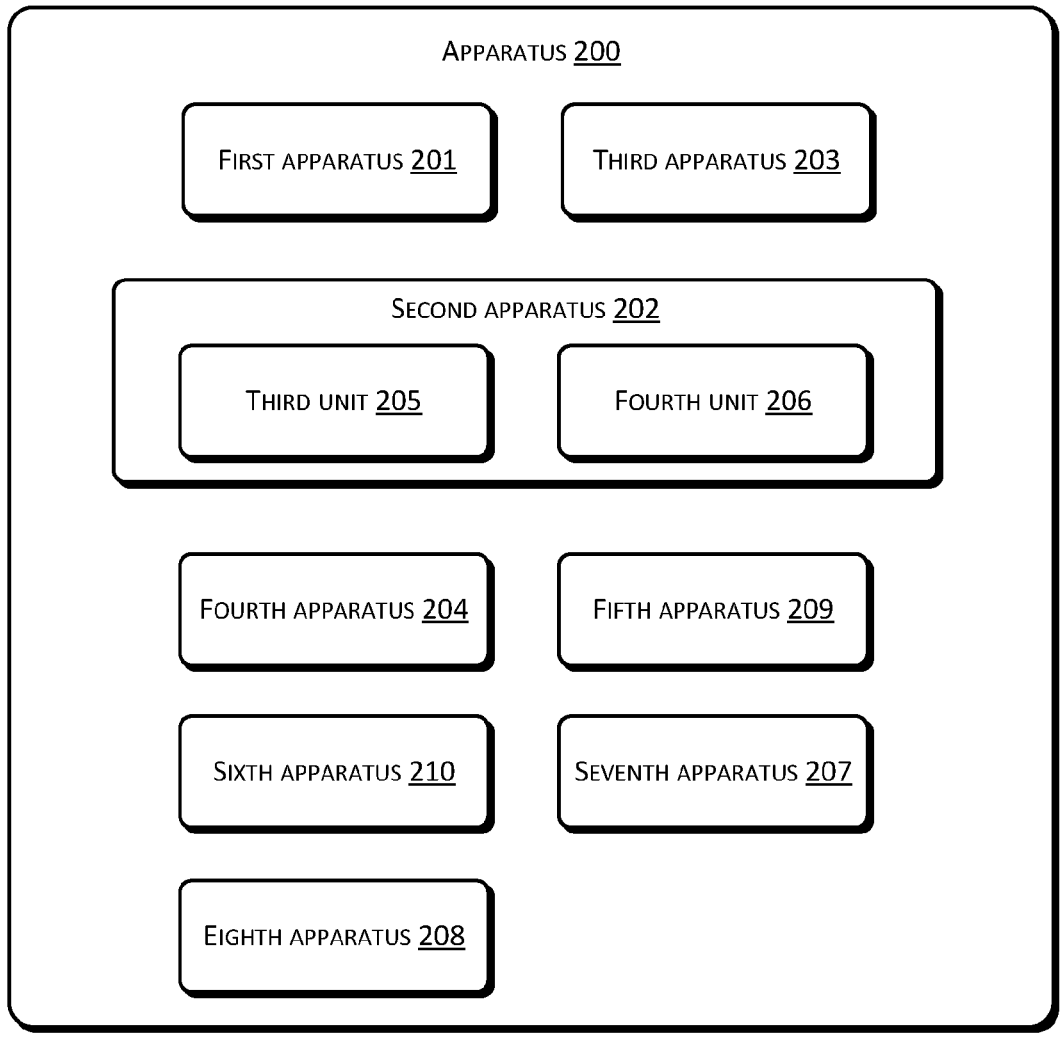
FIG. 2 shows a schematic diagram of an apparatus for processing a retransmission request in distributed computing according to an exemplary embodiment of the present disclosure.

FIG. 2 shows a schematic diagram of an apparatus 200 for processing a retransmission request in distributed computing according to an exemplary embodiment of the present disclosure. In implementations, the apparatus 200 may further include a fourth apparatus 204. The exemplary embodiment is described in detail herein with reference to FIG. 2. In implementations, a first apparatus 201 of the apparatus 200 obtains a retransmission request to be processed in distributed computing. The distributed computing involves at least one data copy, and each data copy includes one or more copy partitions. A second apparatus 202 determines a target copy partition corresponding to the retransmission request based on respective partition response time information of the copy partitions. A third apparatus 203 sends the retransmission request to the target copy partition. The fourth apparatus 204 determines respective partition response speed information of the copy partitions based on respective past partition response time information and/or respective current partition response time information of the copy partitions. The second apparatus 202 determines the target copy partition corresponding to the retransmission request based on the respective partition response speed information of the copy partitions. The first apparatus 201, the second apparatus 202 and the third apparatus 203 of the apparatus 200 are the same or substantially same as corresponding apparatuses shown in FIG. 1, and thus are not redundantly described herein.

The fourth apparatus 204 determines the respective partition response speed information of the copy partitions based on past partition response time information and/or current partition response time information of the copy partitions. The second apparatus 202 determines the target copy partition corresponding to the retransmission request based on the respective partition response speed information of the copy partitions. In implementations, the respective partition response speed information of the copy partitions is determined based on the partition response time information, and the target copy partition is then determined based on the respective partition response speed information. In implementations, the partition response speed information may be current partition response speed information. The partition response speed information may correspond to a variety of forms. For example, at a current time T1, if a partition y of a copy x responds to a certain current request Q1, and the time at which the partition y returns a response to the request Q1 is t1, current partition response time information D1 of the partition y of the copy x is determined based on the response return time t1 of the request Q1. At this point, the current partition response time information D1 of the partition y of the copy x may be used as current partition response speed information of the copy partition. For another example, based on the above example, after the current partition response time information D1 of the partition y of the copy x is known, if the partition y of the copy x has made a response to a current request Q0 at a previous time T0 in the past, and the time at which the partition y has returned the response to the request Q0 is t0, past partition response time information D0 of the partition y of the copy x is determined based on the response return time t0 of the request Q0 corresponding to the time T0. Furthermore, the past partition response time information D0 corresponds to past partition response speed information E0. In this case, a weighting calculation may performed based on the past partition response speed information E0 and the current partition response time information D1 to obtain current partition response speed information E1. An example algorithm may include:

$$E1=[E0 \times b + D1 \times (2-b)]/2 \text{ (}b\text{ is a floating-point number between 0 and 1, e.g., 0.8)}$$

The partition response speed information is acquired via the weighting calculation based on the past partition response speed information and the current partition response time information. Performing a data smoothing processing through the weighting calculation is able to reduce the influence of the past partition response time information, and emphasize the influence of the latest partition response time information. The partition response speed information may reflect a difference between various copy partitions that process task requests, and partition response speed information of each partition may also be updated periodically or in real time to make the data to be more reasonable. Furthermore, the second apparatus 102 of the apparatus 100 determines the target copy partition corresponding to the retransmission request based on the current partition response speed information of the copy partition.

In implementations, the second apparatus 202 may include a third unit 205 and a fourth unit 206. The third unit 205 determines one or more candidate copy partitions according to the retransmission request. The fourth unit 206 determines the target copy partition corresponding to the retransmission request based on respective partition response speed information of the candidate copy partitions.

By way of example and not limitation, the third unit 205 of the second apparatus 202 may determine one or more candidate copy partitions according to the retransmission request. A plurality of candidate copy partitions are determined first. The candidate copy partitions need to include target data that is requested by the retransmission request. Each set of data copy includes a complete set of data needed for computation in the distributed cluster. Each data copy is divided into a plurality of partitions. Standards for dividing individual data copies into partitions may be the same or different. For example, data copy 1 may be divided into n partitions, and data copy 2 may be divided into m partitions. If an initial transmission request corresponding to a retransmission request is transmitted to a $n1^{th}$ partition of the data copy 1, and data that is requested is data W, corresponding candidate copy partition(s) in the data copy 2 is/are corresponding partition(s) including the data W among the m partitions. In implementations, standards for dividing individual data copies are the same in the distributed cluster. Therefore, candidate copy partitions can be quickly determined. For example, n and m are equal in the above example, and data of partitions located in the same positions is also consistent, i.e., data in the $n1^{th}$ partition of the data copy 1 and data in the $m1^{th}$ partition of the data copy 2 are distributed consistently. In this case, if an initial transmission request is a request transmitted to a $k^{th}$ partition of a certain data copy, candidate copy partitions corresponding to a retransmission request are $k^{th}$ partitions of other copies.

The fourth unit 206 of the second apparatus 202 determines the target copy partition corresponding to the retransmission request based on the respective partition response speed information of the candidate copy partitions. Here, each data copy may have copy response speed information that is different from each other due to conditions such as past data load unevenness, cross-room network delay, device transient fault and device hardware difference, etc. Such type of difference is directly reflected in partitions corresponding to each copy. Furthermore, even though the partitions of each copy are divided consistently, same copy partitions in different data copies, such as $a^{th}$ partition of the data copy 1 and $a^{th}$ partition of the data copy 2 may still have a difference in respective partition response speed information. Accordingly, a final target copy partition corresponding to the retransmission request may be selected based on such difference. A number of ways of determining a target copy partition corresponding to a retransmission request may exist. For example, information of an overall copy response speed of a copy may first be obtained based on information of a respective partition response speed of each copy partition, and information of a respective copy response speed corresponding to each data copy is compared with one another to select a target copy. A specific target copy partition corresponding to the retransmission request in the target copy is then selected accordingly. For another example, in implementations, partition response speed information which reflects differences among data copies may be directly adopted to select a target copy partition corresponding to a retransmission request, wherein the differences among the copies may also be indirectly reflected in respective partition response speed information of each copy partition.

In implementations, the fourth unit 206 may accumulate respective partition response speed information of first i number of candidate copy partitions until a ratio between an accumulated sum thereof and a sum of partition response speed information of all of the candidate copy partitions is greater than a random number within an interval (0, 1), and uses an $i^{th}$ candidate copy partition as the target copy partition corresponding to the retransmission request.

In implementations, a method of determining a target copy partition corresponding to a retransmission request may include further determining a plurality of candidate copy partitions based on the obtained retransmission request and obtaining current information of a respective partition response speed corresponding to each candidate copy partition. An example algorithm for selecting a target copy partition based on this solution may include:

```
partition M. sum_score = copy 1.partition M.score +
copy 2.partition M.score + ...
                    copy n.partition M.score
rand = a random floating-point number that is generated between 0 and 1
    for cycle from copy 1.partition M to copy n.partition M
    partition M.accumulate = copy 1.partition M.score +
    copy 2.partition M.score +...
                    copy i.partition M.score
        if rand < partition M.accumulate / partition M. sum_score
            return: select partition i
    end of cycle
select partition n (no selection is made in the above cycle)
```

Data information corresponding to the retransmission request exists in copy partitions M and information of a respective partition response speed of each candidate copy is marked as score. Copy 1, copy 2 . . . copy n are n candidate copies and all the copies correspond to the partitions M with a same data distribution. Copy 1.partition M.score, copy 2.partition M.score . . . copy n.partition M.score are information of respective partition response speeds corresponding to individual candidate copy partitions. Partition M. sum_score is a sum of the information of the respective partition response speeds of all of the candidate copy partitions. First, partition response speed information of the first i number of candidate copy partitions is accumulated. When the partition response speed information of the first i number of candidate copy partitions is accumulated, the $i^{th}$ candidate copy partition is selected as the target copy partition corresponding to the retransmission request when a ratio between an accumulated value of the partition response speed information and a sum of partition response speed information of all of the candidate copy partitions is greater than a random number in an internal (0, 1). If no copy partition is selected at the end of the cycle, the $n^{th}$ copy partition is used as the target copy partition corresponding to the retransmission request. The better the partition response speed information corresponding to a candidate copy partition is, i.e., the greater the value of the score is, the greater the probability of selecting the corresponding copy partition as the target partition is.

One skilled in the art should understand that the above method of determining a target copy partition corresponding to a retransmission request is used for an exemplary purpose only. Other existing or future methods of determining a target copy partition corresponding to the retransmission request, if applicable to the present disclosure shall also be included in the scope of protection of the present disclosure, and are incorporated herein by reference.

In implementations, the random number may be generated in real time.

In implementations, a random number in an interval (0, 1) may be generated in real time, i.e., generated in real time when the target copy partition is selected. The target copy partition is selected based on the random number that is generated in real time and according to a certain probability. Although the probability that a candidate copy partition is selected as the target copy partition is higher if partition response speed information corresponding thereto is better, some partitions with lower partition response speed information may still be selected. Such method of not strictly selecting a partition with the best partition response speed information allows a smoothing processing to be performed on data. Two reasons may exist, One is that partition response speed information of each partition reflects a condition of the respective partition at the time when the partition response speed information was calculated, which cannot fully and accurately represent the latest condition of the respective partition when a retransmission request is performed currently. For example, partition response speed information corresponding to a certain partition may not be desirable due to a device fault, but an operating performance may be currently better than those of other partitions because the device is back to a normal state. Such a change may not be reflected in the partition response speed information corresponding to the partition timely. In this case, the partition is not selected if a selection is totally based on the partition response speed information corresponding thereto, thus failing to take advantage of the performance of the restored device corresponding to the partition. Therefore, a candidate copy partition which has unsatisfactory partition response speed information but has a better actual performance may be selected evenly through a random number generated in real time. The other reason is to avoid large fluctuation of the partition response speed information corresponding to the candidate copy partitions. If a target copy partition is selected strictly according to partition response speed information, a partition with better partition response speed information may accept a large number of requests in a period of time, especially in case of a volume of requests, or even in a flash. The corresponding load may thus quickly increases, and thereby a partition response speed corresponding to such partition is quickly decreased. In this case, subsequent requests may quickly shift to another partition with better partition response speed information. So, each partition is selected in a backward jump mode, resulting in a poor stability and failing to facilitate an overall performance of the cluster.

In implementations, the apparatus 200 may further include a seventh apparatus 207 and an eighth apparatus 208. The seventh apparatus 207 receives a corresponding requested response result. The eighth apparatus 208 updates the partition response speed information of the corresponding copy partition according to a response time of the requested response result.

Specifically, in distributed computing, partition response speed information corresponding to a copy partition may be updated in real time. In implementations, partition response speed information of a copy partition may be updated based on each requested response result returned by the copy partition. The requested response result received by the seventh apparatus may correspond to an initial transmission request or a retransmission request of a requested task which arrives at a corresponding partition. For example, in the present disclosure, when a retransmission task is completed for a target retransmission request in a partition v of a copy u and requested information is returned, at this point, a request response result of the partition v of the copy u that corresponds to the retransmission request is received at a response time t. Information of a partition response speed of the corresponding copy partition may then be updated based on the response time t.

One skilled in the art should understand that the above response time for a request response result is used for an exemplary purpose only. Other existing or potentially available forms of request response results, if applicable to the present disclosure, shall also be included in the scope of protection of the present disclosure, and are incorporated herein by reference.

In implementations, the eighth apparatus 208 may determine request surplus time information of the corresponding copy partition according to the response time of the request response result and a request maximum timeout time of the corresponding copy partition, and updates the partition response speed information of the corresponding copy partition according to the request surplus time information.

In implementations, the eighth apparatus 208 may update the partition response speed information corresponding to the copy partition, which needs multiple pieces of data information: the first piece being a time at which the copy partition to be updated makes a response to the task request and which is received by the seventh apparatus 207, and the second piece being a request maximum timeout time corresponding to the task request in the copy partition to be updated. For example, a request response result corresponding to a retransmission request of a partition v of a copy u is response time t. Meanwhile, the retransmission request corresponds to a request maximum timeout time in a copy partition, and the request maximum timeout time corresponds to the maximum time in which the request is allowed to wait for a response in the partition. Further, request surplus time information of the corresponding copy partition is determined based on the response time of the request response result in the copy partition and the corresponding request maximum timeout time. For example, a request response result corresponding to a retransmission request of a partition v of a copy u is response time t, and a request maximum timeout time of the retransmission request in the partition v is Tm3. In implementations, request surplus time information of the copy partition is Tm3-t. For a copy partition, if a maximum timeout time of a request is closer to a response time of a response result of the request, i.e., a surplus time is shorter, urgent requests may not be accepted subsequently. On the contrary, if the request surplus time is longer, corresponding partition response speed information is better. Moreover, the partition response speed information of the copy partition may be updated based on the surplus time. For example, request surplus time information corresponding to a current request may be directly used as partition response speed information of the copy partition for update. Additionally or alternatively, a weighting calculation may also be performed for current corresponding request surplus time information and past request surplus time information acquired through calculation for the copy partition, and a result of the weighting calculation is set as the updated partition response speed information. As such, this smoothing processing is able to enhance the influence of the latest data.

In addition, for a request maximum timeout time corresponding to each copy partition, a response time of a parent request depends on an execution time of the slowest subtask in distributed computing. Thus, a request maximum timeout time that is determined for a parent request is also applicable to each corresponding child request. For example, if a maximum timeout time corresponding to a parent request 1 is Tm, a maximum timeout time for all corresponding child requests is Tm. When the child requests are first transmitted or retransmitted to individual copy partitions, a request maximum timeout time of the corresponding copy partitions is Tm. A request maximum timeout time may be determined based on different request types and past requested data information. For example, for requests made to the same data in a copy partition, a request Y1 is a request from a buyer of a transaction, and a request Y2 is a request from a seller of the transaction. In this case, a request maximum timeout time for the corresponding copy partition may be a maximum timeout time Tm1 of the request Y1 when this request is received, or a maximum timeout time Tm2 of the request Y2 when this request is received. Tm1 and Tm2 may be different.

In implementations, the apparatus 200 may further include a fifth apparatus 209 and a sixth apparatus 210. The fifth apparatus 209 obtains an initial transmission request to be processed in distributed computing. The sixth apparatus 210 determines a copy partition corresponding to the initial transmission request based on the respective partition response speed information of the copy partitions, and sends the initial transmission request to the copy partition corresponding to the initial transmission request.

Specifically, in actual distributed computing, the method described in the present disclosure is able to optimize retransmission of a task request to preferentially select a copy with a better response time. Furthermore, for an initial transmission request of each child request corresponding to a parent request, a copy partition corresponding to the initial transmission request may also be determined based on known partition response speed information of individual copy partitions, and the initial transmission request is sent to the copy partition corresponding to the initial transmission request. As compared with existing solutions, the number of times of retransmission can be fundamentally reduced, which effectively reduces requests that need to be retransmitted subsequently due to long response times and reduces the actual load of a cluster. Details of a process of operations is identical or similar to that of selecting a corresponding target copy partition for a retransmission request, which is not redundantly described herein.

Figure 3:
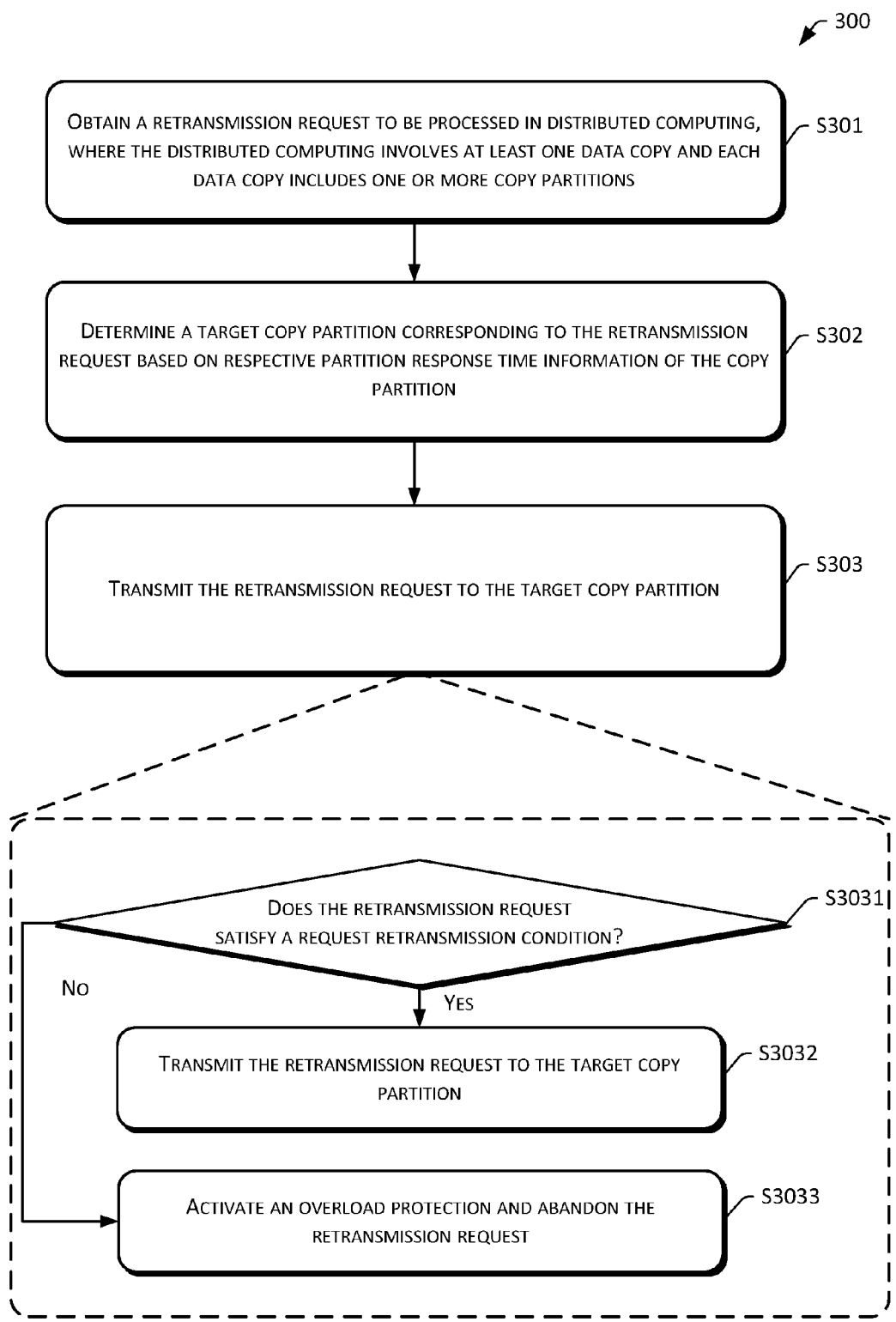
FIG. 3 shows a flowchart of a method for processing a retransmission request in distributed computing according to another aspect of the present disclosure.

FIG. 3 shows a flowchart of a method 300 for processing a retransmission request in distributed computing according to another aspect of the present disclosure.

At S301, the apparatus 100 obtains a retransmission request to be processed in distributed computing. The distributed computing involves at least one data copy and each data copy includes one or more copy partitions. At S302, the apparatus 100 determines a target copy partition corresponding to the retransmission request based on respective partition response time information of the copy partitions. At S303, the apparatus 100 transmits the retransmission request to the target copy partition.

In implementations, at S301, the apparatus 100 obtains a retransmission request to be processed in distributed computing. The distributed computing involves at least one data copy and each data copy includes one or more copy partitions. In distributed computing, solving a task request issued by a user often needs a huge amount of computing capability. In this case, such complex parent request is divided into a plurality of child requests. The plurality of child requests are then separately sent by a server to a plurality of computation nodes of a distributed cluster for processing. All computation results are returned and summarized after the processing is completed by the computation nodes. Multiple copies of data may exist in the distributed cluster. Each copy of data includes a complete set of data that is needed in distributed computing. Each copy of data is further divided into multiple copy partitions. Each copy partition includes partial data in a corresponding copy of data. In implementations, partitions corresponding to each copy of data are divided consistently. For example, data copy 1 and data copy 2 may exist in the system simultaneously. The two copies of data are respectively divided into M partitions, and data distributed in corresponding partitions are the same. For example, a partition 1 of the data copy 1 and a partition 1 of the data copy 2 are consistent, a partition 2 of the data copy 1 and a partition 2 of the data copy 2 are consistent, and so on. The distributed cluster may be formed by a plurality of servers. Each server is a computation node, which may store one or more pieces of partition data. Respective devices corresponding to partitions of data copy may be located in a same device room or may be deployed across multiple device rooms. Devices corresponding to multiple data copies may also be simultaneously deployed in a single device room.

Some common problems in a distributed cluster, such as cross-room network delay, device transient fault, device hardware difference and data fragmentation unevenness, etc., may cause an imbalance in response times of computation nodes. At this point, a child request for which a response is not made timely is defined as a long-tail request, i.e., a retransmission request to be processed. The retransmission request to be processed can be acquired based on a defined ratio time, i.e., retransmitting a task needs to be initiated when the target request exceeds a predefined ratio time. Alternatively, a determination may be made as to whether to start to retransmit the task when results are returned by a certain proportion of partitions. For example, a parent request is divided into 100 target child requests, which correspond to 100 partitions. When 30% of partitions return requested results and the remaining requests are still in a process of execution, a determination may be made to start to retransmit the remaining tasks which are still in the process of execution to acquire retransmission requests.

At S302, the apparatus 100 determines a target copy partition corresponding to the retransmission request based on the information of respective partition response times of the copy partitions. Based on redundant copy partitions in the system, a copy partition may be reselected for transmitting the retransmission request. Such copy partition has corresponding data information that is needed by the retransmission request. In implementations, the division of partitions corresponding to each data copy is consistent. Therefore, the retransmission request is able to match with a corresponding partition of each copy. Generally, a difference exists between the same partitions of different copies in terms of a response condition with respect to a same retransmission request. For example, two copy partitions may exist for a retransmission request A at the same time. A partition 3 of a copy 1 and a partition 3 of a copy 2 both include requested data corresponding to the retransmission request A. However, due to reasons such as data load at this point, differences among devices corresponding to the two copy partitions or an existence of failure on a device corresponding to one of the copy partitions, actual request-response effects of the two copy partitions with respect to the retransmission request A may be different. In order to complete the entire computation more effectively, a copy partition having a better response effect may be preferentially selected as a target copy partition of the retransmission request A. In implementations, the target copy partition corresponding to the retransmission request is determined based on the information of respective partition response times of the copy partitions. Information of a partition response time may include partition information which is acquired through analysis and computation based on data such as response times of past requests and real-time requests received by an associated partition. Generally, the copy partition with the better response effect may be selected by comparing the information of the respective partition response times of the copy partitions with one another. In implementations, in distributed computing, each copy partition may accept a large number of different data requests in each period of time. As such, a data load of the partition continuously changes. Thus, information of a partition response time of each copy partition cannot stay unchanged and needs to be updated in real time. In the present disclosure, the past requests or real-time requests based on which an update is performed include an initial transmission request and a retransmission request of a certain data request. Furthermore, the system may set up an update period such as, after every time interval T, to update corresponding partition response time information. Additionally or alternatively, corresponding partition response time information may also be updated based on response times of the real-time requests. Additionally or alternatively, more reasonable partition response time information may be acquired by performing a weight calculation to the response times of the past requests and the real-time requests. Furthermore, when a corresponding target copy partition needs to be selected for a retransmission request, a screening may be performed based on information of a respective partition response time corresponding to each copy partition at this point to acquire a final target copy partition.

One skilled in the art should understand that the above approach of determining a target copy partition corresponding to a retransmission request based on information of respective partition response times of copy partitions is used for an exemplary purpose. Other existing or later available methods of determining a target copy partition corresponding to a retransmission request, if applicable to the present disclosure, shall also be included in the scope of protection of the present disclosure, and are incorporated herein by reference.

At S303, the apparatus 100 transmits the retransmission request to the target copy partition. Upon determining the target copy partition corresponding to the retransmission request, the requested task may be further retransmitted to a new copy partition and wait for information returned by the new copy partition. In the present disclosure, the distributed computing may include real-time computation and non-real-time computation. Particularly, when the distributed computing is non-real-time computation, an order of magnitude associated with a time for performing the task is relatively large, which may be, for example, minutes, hours, or even longer. If a result of a first retransmission is not ideal at this point, a second retransmission, a third retransmission, etc., may be continuously performed according to the present disclosure within an allowable range of performance overhead. In addition, a predetermination for retransmission may be carried out for the target copy partition before sending a retransmission request. A purpose thereof is to abandon useless retransmission and to reduce an overall actual load of a cluster in scenarios such as occurrences of heavy-load clusters and skewed partitions.

In existing technologies, a retransmission request is sent to different copies with the same probability for the long tail phenomenon. At this point, retransmitting a task is based on two premises: one is that a retransmission request is responded more preferentially than the original request by default assumption; and the other is that the performance overhead caused by the retransmission request is low, which does not affect other requests in normal processing. However, in real computation, such premises are not always established. For example, when the entire cluster is in a heavy-load state, a relatively long time still needs to be taken to respond to a retransmission request if a device which accepts the retransmission request is already in the heavy-load state. At this point, the retransmission cannot improve the cluster's response time but increases the burden of the cluster. For another example, if a data partition on which a computation task depends is skewed, such as unevenness in data partitioning, a skew in data access and the like, at this point, response times of corresponding partitions in all copies for a retransmission request are long, thus failing to facilitate task retransmission. Furthermore, if a copy corresponding to a computation task is skewed due to reasons such as time delay differences in network accesses, differences in devices, hardware faults and the like, equivalent copies including the same data in the distributed cluster may also have differences in response times even though the load is the same. These scenarios cause obvious deficiencies in the applicability of the existing technologies, which cannot solve the long tail problem.

Compared with the existing technologies, the present disclosure distinguishes individual partitions according to partition response times of the copy partitions to determine a target copy partition corresponding to a retransmission request, thus enabling a better selection of a copy with a better response time in retransmission, and reducing a response time of the retransmission request and an overall load of a cluster to optimize an overall distributed computing.

In implementations, the method block S303 of the method may include S3031 and S3032. At S3031, the apparatus 100 detects whether the retransmission request satisfies a request retransmission condition. At S3032, the apparatus 100 transmits the retransmission request to the target copy partition in response to the retransmission request satisfying the request retransmission condition.

In implementations, with respect to the obtained retransmission request, an optimal target copy partition corresponding to the retransmission request is determined based on the respective partition response time of each copy partition. However, sometimes, the cluster computation may not be optimized in reality when the retransmission is completed in the target copy partition. For example, when the entire cluster is in the heavy-load state or when the data partition on which the computation task depends is skewed such as an unevenness in data partitioning, a skew in data accesses, etc., partition response times in all the copies for the corresponding retransmission request are relatively long, which fails to facilitate task retransmission. In this case, abandoning the retransmission request may be selected to avoid possible useless retransmission and thus reduce an actual load of the cluster. In implementations, a corresponding request retransmission condition may be set up based on an overload situation that potentially exists for a copy partition corresponding to the task request. At S3031, the apparatus 100 may detect whether the retransmission request satisfies the set request transmission condition. If the request retransmission condition is not satisfied, an overload protection is activated, i.e., a determination is made that the corresponding target copy partition is overloaded, and the retransmission is abandoned at S3033. If the retransmission request satisfies the request retransmission condition, a determination is made to perform an operation for the retransmission, and the apparatus 100 sends the retransmission request to the target copy partition at S3032.

In implementations, at S3031, the apparatus 100 may determine whether the retransmission request satisfies the request retransmission condition based on partition response time information of the target copy partition and a maximum timeout time corresponding to the retransmission request.

By way of example and not limitation, a determination of whether the retransmission request satisfies the request retransmission condition may be made based on information of a partition response time of the target copy partition corresponding to the retransmission request and a maximum timeout time corresponding to the retransmission request in the target copy partition. A maximum timeout time corresponds to the maximum time allowed by a request to wait for a response in a partition. In implementations, in distributed computing, maximum timeout times corresponding to child requests from the same parent request are consistent, and child requests from different parent requests may correspond to different maximum timeout times. A difference between the set maximum timeout times may be based on a difference between sources corresponding to task requests. A predetermination may be made for the retransmission request based on the maximum timeout time corresponding to the retransmission request and the information of the partition response time of the target copy partition. For example, if the maximum timeout time corresponding to the retransmission request in the copy partition is T, and the information of the partition response time for the current target copy partition is score, a determination may be made that the request retransmission condition is not satisfied and the overload protection is activated when score<T×a (a is a floating-point number between 0 and 1). For example, when a is 0.5, if the partition response time information, score, is smaller than half of the request maximum timeout time of the copy partition at this point, for example, this indicates that a longer time may be needed to respond to the request that is sent to the target copy partition due to the heavy load of a device corresponding to the target copy partition, and the retransmission may be abandoned in this case. Otherwise, this may indicate that the request retransmission condition is satisfied and therefore the retransmission request may be sent to the target copy partition.

One skilled in the art should understand that the above approach of determining whether a retransmission request satisfies a request retransmission condition is used for an exemplary purpose only. Other existing or future methods of determining whether a retransmission request satisfies a request retransmission condition, if applicable to the present disclosure, shall also be included in the scope of protection of the present disclosure, and are incorporated herein by reference.

Figure 4:
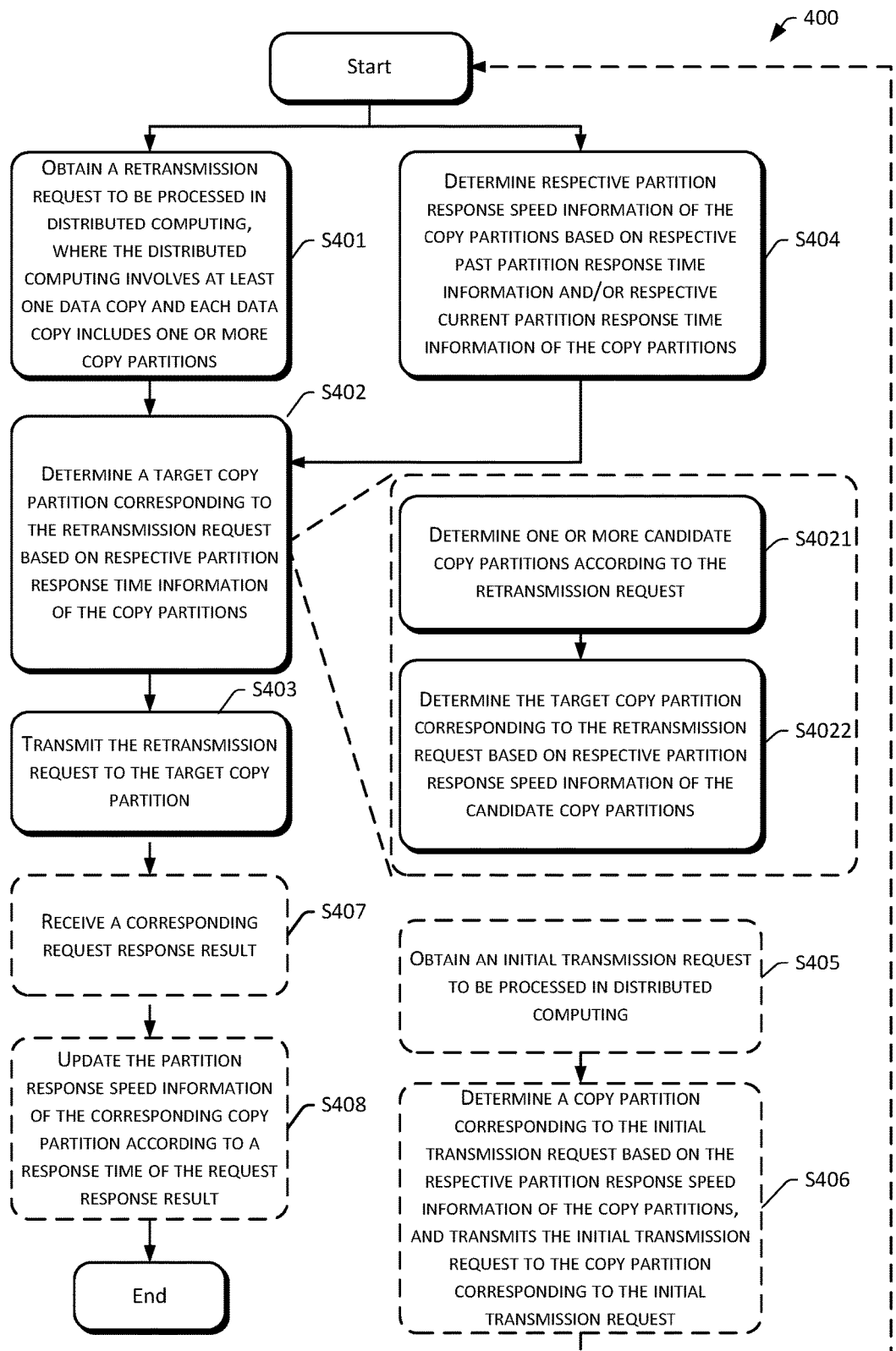
FIG. 4 shows a flowchart of a method for processing a retransmission request in distributed computing according to an exemplary embodiment of the present disclosure.

FIG. 4 shows a flowchart of a method 400 for processing a retransmission request in distributed computing according to an exemplary embodiment of the present disclosure. The method 400 further includes S404. The exemplary embodiment is described in detail herein with reference to FIG. 4. Specifically, at S401, the apparatus 100 obtains a retransmission request to be processed in distributed computing.

The distributed computing involves at least one data copy and each data copy includes one or more copy partitions. At S402, the apparatus 100 determines a target copy partition corresponding to the retransmission request based on respective partition response time information of the copy partitions. At S403, the apparatus 100 transmits the retransmission request to the target copy partition. At S404, the apparatus 100 determines respective partition response speed information of the copy partitions based on respective past partition response time information and/or respective current partition response time information of the copy partitions. At S402, the apparatus 100 determines the target copy partition corresponding to the retransmission request based on the respective partition response speed information of the copy partitions. The method blocks S401, S402 and S403 are the same or substantially the same as the corresponding method blocks shown in FIG. 3, and thus are not redundantly described herein, and are incorporated herein by reference.

At S404, the apparatus 100 determines the respective partition response speed information of the copy partitions based on past partition response time information and/or current partition response time information of the copy partitions. At S402, the apparatus 100 determines the target copy partition corresponding to the retransmission request based on the respective partition response speed information of the copy partitions. In implementations, the respective partition response speed information of the copy partitions is determined based on the partition response time information, and the target copy partition is then determined based on the respective partition response speed information. In implementations, the partition response speed information may be current partition response speed information. The partition response speed information may correspond to a variety of forms. For example, at a current time T1, if a partition y of a copy x responds to a certain current request Q1, and the time at which the partition y returns a response to the request Q1 is t1, current partition response time information D1 of the partition y of the copy x is determined based on the response return time t1 of the request Q1. At this point, the current partition response time information D1 of the partition y of the copy x may be used as current partition response speed information of the copy partition. For another example, based on the above example, after the current partition response time information D1 of the partition y of the copy x is known, if the partition y of the copy x has made a response to a current request Q0 at a previous time T0 in the past, and the time at which the partition y has returned the response to the request Q0 is t0, past partition response time information D0 of the partition y of the copy x is determined based on the response return time t0 of the request Q0 corresponding to the time T0. Furthermore, the past partition response time information D0 corresponds to past partition response speed information E0. In this case, a weighting calculation may performed based on the past partition response speed information E0 and the current partition response time information D1 to obtain current partition response speed information E1. An example algorithm may include:

$$E1=[E0\times b+D1\times(2-b)]/2 \ (b \text{ is a floating-point number between 0 and 1, e.g., 0.8})$$

The partition response speed information is acquired via the weighting calculation based on the past partition response speed information and the current partition response time information. Performing a data smoothing processing through the weighting calculation is able to reduce the influence of the past partition response time information, and emphasize the influence of the latest partition response time information. The partition response speed information may reflect a difference between various copy partitions that process task requests, and partition response speed information of each partition may also be updated periodically or in real time to make the data to be more reasonable. Furthermore, at S402, the apparatus 100 determines the target copy partition corresponding to the retransmission request based on the current partition response speed information of the copy partition.

In implementations, the method block S402 may include S4021 and S4022. At S4021, the apparatus 100 determines one or more candidate copy partitions according to the retransmission request. At S4022, the apparatus 100 determines the target copy partition corresponding to the retransmission request based on respective partition response speed information of the candidate copy partitions.

By way of example and not limitation, at S4021, the apparatus 100 may determine one or more candidate copy partitions according to the retransmission request. A plurality of candidate copy partitions are determined first. The candidate copy partitions need to include target data that is requested by the retransmission request. Each set of data copy includes a complete set of data needed for computation in the distributed cluster. Each data copy is divided into a plurality of partitions. Standards for dividing individual data copies into partitions may be the same or different. For example, data copy 1 may be divided into n partitions, and data copy 2 may be divided into m partitions. If an initial transmission request corresponding to a retransmission request is transmitted to a $n1^{th}$ partition of the data copy 1, and data that is requested is data W, corresponding candidate copy partition(s) in the data copy 2 is/are corresponding partition(s) including the data W among the m partitions. In implementations, standards for dividing individual data copies are the same in the distributed cluster. Therefore, candidate copy partitions can be quickly determined. For example, n and m are equal in the above example, and data of partitions located in the same positions is also consistent, i.e., data in the $n1^{th}$ partition of the data copy 1 and data in the $m1^{th}$ partition of the data copy 2 are distributed consistently. In this case, if an initial transmission request is a request transmitted to a $k^{th}$ partition of a certain data copy, candidate copy partitions corresponding to a retransmission request are $k^{th}$ partitions of other copies.

At S4022, the apparatus 100 may determine the target copy partition corresponding to the retransmission request based on the respective partition response speed information of the candidate copy partitions. Here, each data copy may have copy response speed information that is different from each other due to conditions such as past data load unevenness, cross-room network delay, device transient fault and device hardware difference, etc. Such type of difference is directly reflected in partitions corresponding to each copy. Furthermore, even though the partitions of each copy are divided consistently, same copy partitions in different data copies, such as $a^{th}$ partition of the data copy 1 and $a^{th}$ partition of the data copy 2 may still have a difference in respective partition response speed information. Accordingly, a final target copy partition corresponding to the retransmission request may be selected based on such difference. A number of ways of determining a target copy partition corresponding to a retransmission request may exist. For example, information of an overall copy response speed of a copy may first be obtained based on information of a respective partition response speed of each copy partition, and information of a respective copy response speed corresponding to each data copy is compared with one another to select a target copy. A specific target copy partition corresponding to the retransmission request in the target copy is then selected accordingly. For another example, in implementations, partition response speed information which reflects differences among data copies may be directly adopted to select a target copy partition corresponding to a retransmission request, wherein the differences among the copies may also be indirectly reflected in respective partition response speed information of each copy partition.

In implementations, at S4022, the apparatus 100 may accumulate respective partition response speed information of first i number of candidate copy partitions until a ratio between an accumulated sum thereof and a sum of partition response speed information of all of the candidate copy partitions is greater than a random number within an interval (0, 1), and uses an $i^{th}$ candidate copy partition as the target copy partition corresponding to the retransmission request.

In implementations, a method of determining a target copy partition corresponding to a retransmission request may include further determining a plurality of candidate copy partitions based on the obtained retransmission request and obtaining current information of a respective partition response speed corresponding to each candidate copy partition. An example algorithm for selecting a target copy partition based on this solution may include:

--- partition M. sum_score = copy 1.partition M.score + copy 2.partition M.score + ...
                      copy n.partition M.score
rand = a random floating-point number that is generated between 0 and 1
   for cycle from copy 1.partition M to copy n.partition M
   partition M.accumulate = copy 1.partition M.score + copy 2.partition M.score +...
                      copy i.partition M.score
   if rand < partition M.accumulate / partition M. sum_score
      return: select partition i
   end of cycle
select partition n (no selection is made in the above cycle)

---

Data information corresponding to the retransmission request exists in copy partitions M and information of a respective partition response speed of each candidate copy is marked as score. Copy 1, copy 2 . . . copy n are n candidate copies and all the copies correspond to the partitions M with a same data distribution. Copy 1.partition M.score, copy 2.partition M.score . . . copy n.partition M.score are information of respective partition response speeds corresponding to individual candidate copy partitions. Partition M. sum_score is a sum of the information of the respective partition response speeds of all of the candidate copy partitions. First, partition response speed information of the first i number of candidate copy partitions is accumulated. When the partition response speed information of the first i number of candidate copy partitions is accumulated, the $i^{th}$ candidate copy partition is selected as the target copy partition corresponding to the retransmission request when a ratio between an accumulated value of the partition response speed information and a sum of partition response speed information of all of the candidate copy partitions is greater than a random number in an internal (0, 1). If no copy partition is selected at the end of the cycle, the $n^{th}$ copy partition is used as the target copy partition corresponding to the retransmission request. The better the partition response speed information corresponding to a candidate copy partition is, i.e., the greater the value of the score is, the greater the probability of selecting the corresponding copy partition as the target partition is.

One skilled in the art should understand that the above method of determining a target copy partition corresponding to a retransmission request is used for an exemplary purpose only. Other existing or future methods of determining a target copy partition corresponding to the retransmission request, if applicable to the present disclosure shall also be included in the scope of protection of the present disclosure, and are incorporated herein by reference.

In implementations, the random number may be generated in real time.

For example, the random number is generated in real time.

In implementations, a random number in an interval (0, 1) may be generated in real time, i.e., generated in real time when the target copy partition is selected. The target copy partition is selected based on the random number that is generated in real time and according to a certain probability. Although the probability that a candidate copy partition is selected as the target copy partition is higher if partition response speed information corresponding thereto is better, some partitions with lower partition response speed information may still be selected. Such method of not strictly selecting a partition with the best partition response speed information allows a smoothing processing to be performed on data. Two reasons may exist, One is that partition response speed information of each partition reflects a condition of the respective partition at the time when the partition response speed information was calculated, which cannot fully and accurately represent the latest condition of the respective partition when a retransmission request is performed currently. For example, partition response speed information corresponding to a certain partition may not be desirable due to a device fault, but an operating performance may be currently better than those of other partitions because the device is back to a normal state. Such a change may not be reflected in the partition response speed information corresponding to the partition timely. In this case, the partition is not selected if a selection is totally based on the partition response speed information corresponding thereto, thus failing to take advantage of the performance of the restored device corresponding to the partition. Therefore, a candidate copy partition which has unsatisfactory partition response speed information but has a better actual performance may be selected evenly through a random number generated in real time. The other reason is to avoid large fluctuation of the partition response speed information corresponding to the candidate copy partitions. If a target copy partition is selected strictly according to partition response speed information, a partition with better partition response speed information may accept a large number of requests in a period of time, especially in case of a volume of requests, or even in a flash. The corresponding load may thus quickly increases, and thereby a partition response speed corresponding to such partition is quickly decreased. In this case, subsequent requests may quickly shift to another partition with better partition response speed information. So, each partition is selected in a backward jump mode, resulting in a poor stability and failing to facilitate an overall performance of the cluster.

In implementations, the method 400 may further include S407 and S408. At S407, the apparatus 100 receives a corresponding request response result. At S408, the apparatus 100 updates the partition response speed information of the corresponding copy partition according to a response time of the request response result.

Specifically, in distributed computing, partition response speed information corresponding to a copy partition may be updated in real time. In implementations, partition response speed information of a copy partition may be updated based on each requested response result returned by the copy partition. At S408, the requested response result received by the apparatus 100 may correspond to an initial transmission request or a retransmission request of a requested task which arrives at a corresponding partition. For example, in the present disclosure, when a retransmission task is completed for a target retransmission request in a partition v of a copy u and requested information is returned, at this point, a request response result of the partition v of the copy u that corresponds to the retransmission request is received at a response time t. Information of a partition response speed of the corresponding copy partition may then be updated based on the response time t.

One skilled in the art should understand that the above response time for a request response result is used for an exemplary purpose only. Other existing or potentially available forms of request response results, if applicable to the present disclosure, shall also be included in the scope of protection of the present disclosure, and are incorporated herein by reference.

In implementations, at S408, the apparatus 100 may determine request surplus time information of the corresponding copy partition according to the response time of the request response result and a request maximum timeout time of the corresponding copy partition, and updates the partition response speed information of the corresponding copy partition according to the request surplus time information.

In implementations, at S408, the apparatus 100 may update the partition response speed information corresponding to the copy partition, which needs multiple pieces of data information: the first piece being a time at which the copy partition to be updated makes a response to the task request and which is received by the apparatus 100, and the second piece being a request maximum timeout time corresponding to the task request in the copy partition to be updated. For example, a request response result corresponding to a retransmission request of a partition v of a copy u is response time t. Meanwhile, the retransmission request corresponds to a request maximum timeout time in a copy partition, and the request maximum timeout time corresponds to the maximum time in which the request is allowed to wait for a response in the partition. Further, request surplus time information of the corresponding copy partition is determined based on the response time of the request response result in the copy partition and the corresponding request maximum timeout time. For example, a request response result corresponding to a retransmission request of a partition v of a copy u is response time t, and a request maximum timeout time of the retransmission request in the partition v is Tm3. In implementations, request surplus time information of the copy partition is Tm3-t. For a copy partition, if a maximum timeout time of a request is closer to a response time of a response result of the request, i.e., a surplus time is shorter, urgent requests may not be accepted subsequently. On the contrary, if the request surplus time is longer, corresponding partition response speed information is better. Moreover, the partition response speed information of the copy partition may be updated based on the surplus time. For example, request surplus time information corresponding to a current request may be directly used as partition response speed information of the copy partition for update. Additionally or alternatively, a weighting calculation may also be performed for current corresponding request surplus time information and past request surplus time information acquired through calculation for the copy partition, and a result of the weighting calculation is set as the updated partition response speed information. As such, this smoothing processing is able to enhance the influence of the latest data.

In addition, for a request maximum timeout time corresponding to each copy partition, a response time of a parent request depends on an execution time of the slowest subtask in distributed computing. Thus, a request maximum timeout time that is determined for a parent request is also applicable to each corresponding child request. For example, if a maximum timeout time corresponding to a parent request 1 is Tm, a maximum timeout time for all corresponding child requests is Tm. When the child requests are first transmitted or retransmitted to individual copy partitions, a request maximum timeout time of the corresponding copy partitions is Tm. A request maximum timeout time may be determined based on different request types and past requested data information. For example, for requests made to the same data in a copy partition, a request Y1 is a request from a buyer of a transaction, and a request Y2 is a request from a seller of the transaction. In this case, a request maximum timeout time for the corresponding copy partition may be a maximum timeout time Tm1 of the request Y1 when this request is received, or a maximum timeout time Tm2 of the request Y2 when this request is received. Tm1 and Tm2 may be different.

In implementations, the method 400 may further include S405 and S406. At S405, the apparatus 100 obtains an initial transmission request to be processed in distributed computing. At S406, the apparatus 100 determines a copy partition corresponding to the initial transmission request based on the respective partition response speed information of the copy partitions, and transmits the initial transmission request to the copy partition corresponding to the initial transmission request.

Specifically, in actual distributed computing, the method described in the present disclosure is able to optimize retransmission of a task request to preferentially select a copy with a better response time. Furthermore, for an initial transmission request of each child request corresponding to a parent request, a copy partition corresponding to the initial transmission request may also be determined based on known partition response speed information of individual copy partitions, and the initial transmission request is sent to the copy partition corresponding to the initial transmission request. As compared with existing solutions, the number of times of retransmission can be fundamentally reduced, which effectively reduces requests that need to be retransmitted subsequently due to long response times and reduces the actual load of a cluster. Details of a process of operations is identical or similar to that of selecting a corresponding target copy partition for a retransmission request, which is not redundantly described herein.

Figure 5:
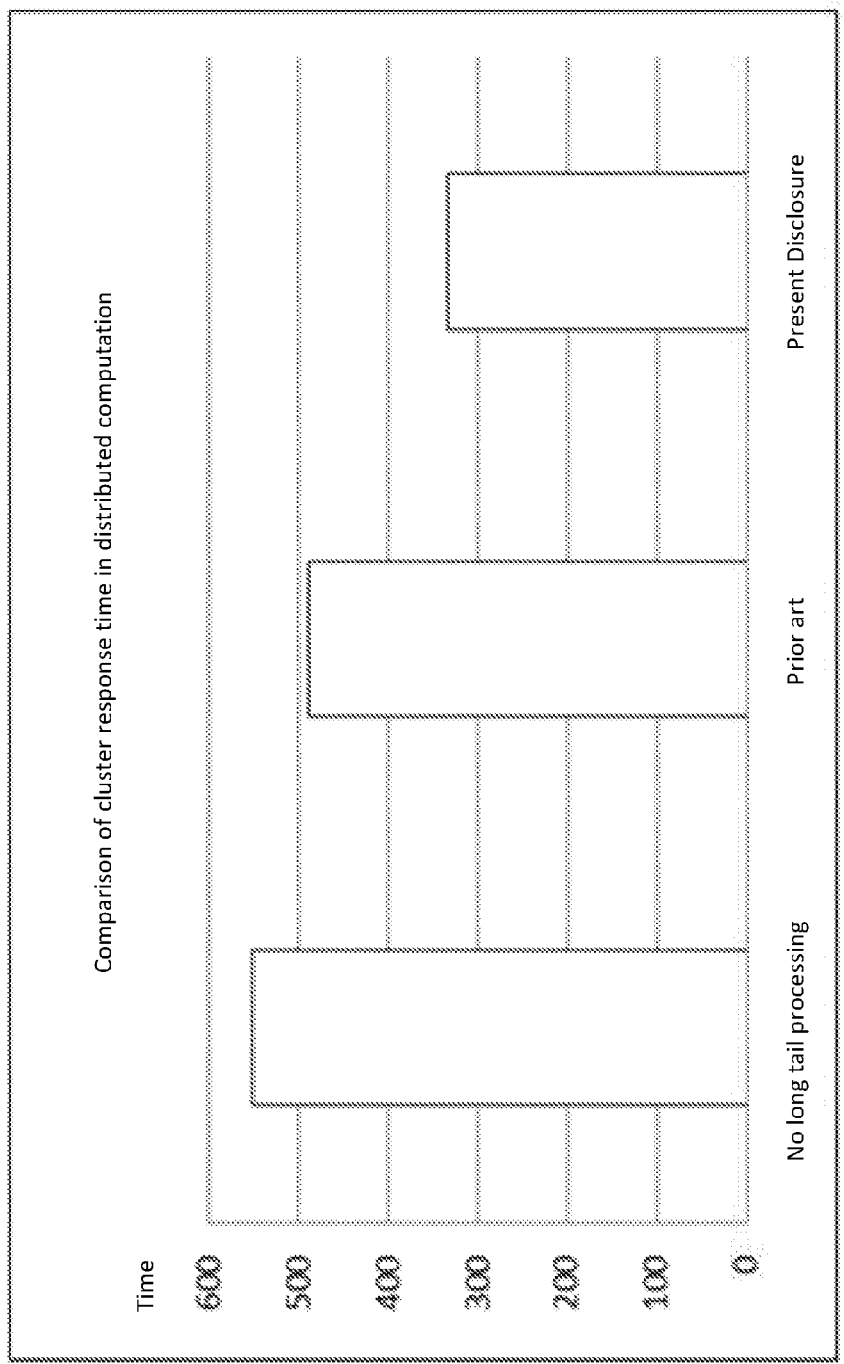
FIG. 5 shows a diagram of a technical effect comparison between an exemplary embodiment of the present disclosure and existing technologies.

FIG. 5 shows a diagram illustrating a comparison of technical effects between an exemplary embodiment of the present disclosure and existing technologies.

By way of example and not limitation, based on a model of a long tail application scenario therein, this figure shows respective times at which a distributed cluster makes a response to a task request using different techniques. The shorter the response time is, the better the technical effect is. As compared with a processing condition having no long tail, the long tail optimization in the existing technologies causes a reduction in response times of the cluster by 13%. With the same processing condition having no long tail, the technical solution of the present disclosure causes a reduction in the response times of the cluster by 40%, and an overall performance thereof is improved significantly as compared to the existing technologies. In addition, respective variances of response times of computation nodes are further compared. By adopting this solution, a variance of the response times of the computation nodes is decreased by 73%-82%. This decrease in the variance indicates a trend in balancing of response times of individual computation nodes. In other words, an overall load of a cluster is balanced and optimized using the present disclosure, and the effects are remarkable.

Figure 6:
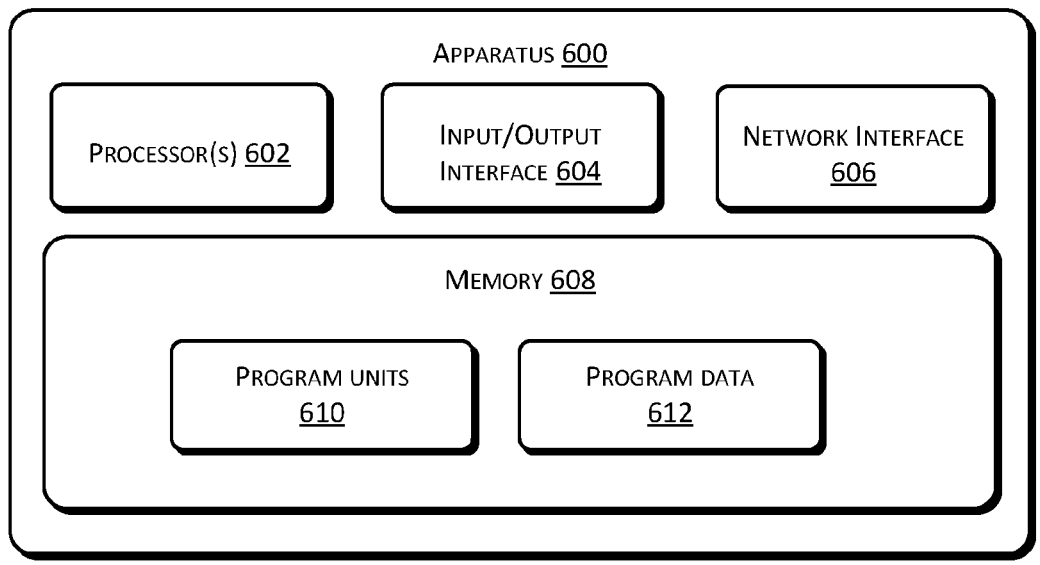
FIG. 6 shows a diagram of the example apparatuses as described in FIGS. 1 and 2 in more details.

FIG. 6 shows an example apparatus 600, such as the apparatuses 100-103, 200-204, as described in FIGS. 1-4 in more detail. In implementations, the apparatus 600 may include one or more processors 602, an input/output (I/O) interface 604, a network interface 606, and memory 608.

The memory 608 may include a form of computer-readable media. By way of example and not limitation, the memory 608 is an example of computer-readable media. In implementations, the memory 608 may include one or more program units 610 and program data 612.

Apparently, for one skilled in the art, the present disclosure is not limited to the details of the exemplary embodiments, and the present disclosure can be implemented in other specific forms without departing from the spirit or features of the present disclosure. Therefore, the embodiments should be considered as exemplary and non-limiting in all different aspects. The scope of the present disclosure is defined by the appended claims rather than the specification. Hence, all variations which fall into the spirit and scope of equivalents of the appended claims are included in the present disclosure. Furthermore, labels of the accompanying drawings in the claims shall not be considered as limitations to the claims at issue. In addition, a term "include" does not exclude other units or method blocks. A singular form does not exclude a plural form. Units or apparatuses in apparatus claims may also be implemented by a single unit or apparatus through software or hardware. Terms such as "first", "second" and the like are used for indicating names rather than a particular order.

What is claimed is:

1. A method comprising:
   obtaining a retransmission request of a computation task to be processed in a distributed cluster, the computation task relating to data having at least one data copy, the at least one data copy comprising a plurality of copy partitions;
   determining a target copy partition corresponding to the retransmission request based at least in part on comparing respective partition response times of candidate copy partitions in the distributed cluster, wherein determining the target copy partition comprises:
      accumulating partition response speed information of a subset of the plurality of candidate copy partitions until a ratio between an accumulated sum of the subset of the plurality of candidate copy partitions and a sum of partition response speed information of the plurality of candidate copy partitions is greater than a random number; and
      setting a last candidate copy partition of the subset of the plurality of candidate copy partitions as the target copy partition corresponding to the retransmission request; and sending the retransmission request to the target copy partition.

2. The method of claim 1, wherein sending the retransmission request to the target copy partition comprises:
    detecting whether the retransmission request satisfies a request retransmission condition; and
    sending the retransmission request to the target copy partition in response to the retransmission request satisfying the request retransmission condition.

3. The method of claim 2, wherein detecting whether the retransmission request satisfies the request retransmission condition comprises determining whether the retransmission request satisfies the request retransmission condition based at least in part on a partition response time of the target copy partition and a maximum timeout time corresponding to the retransmission request.

4. The method of claim 1, further comprising determining respective partition response speed information of the copy partitions based at least in part on respective past partition response times and/or respective current partition response times of the copy partitions, wherein determining the target copy partition comprises determining the target copy partition corresponding to the retransmission request based at least in part on the respective partition response speed information of the copy partitions.

5. The method of claim 4, wherein determining the target copy partition comprises:
    determining a plurality of candidate copy partitions according to the retransmission request; and
    determining the target copy partition corresponding to the retransmission request based on corresponding partition response speed information of the plurality of candidate copy partitions.

6. The method of claim 4, further comprising:
    obtaining an initial transmission request to be processed in the distributed cluster; and
    determining a copy partition corresponding to the initial transmission request based at least in part on the respective partition response speed information of the copy partitions; and
    sending the initial transmission request to the copy partition corresponding to the initial transmission request.

7. The method of claim 4, further comprising:
    receiving a response result corresponding to the retransmission request; and
    updating partition response speed information of the target copy partition based at least in part on a response time of the response result.

8. The method of claim 7, wherein updating the partition response speed information of the target copy partition comprises:
    determining request surplus time information of the target copy partition according to the response time of the response result and a request maximum timeout time of the target copy partition; and
    updating the partition response speed information of the target copy partition based on the request surplus time information.

9. A system comprising:
    one or more processors;
    memory;
    a first apparatus stored in the memory and executable by the one or more processors to obtain a retransmission request of a computation task to be processed in a distributed cluster, the computation task relating to data having at least one data copy, the at least one data copy comprising a plurality of copy partitions;
    a second apparatus stored in the memory and executable by the one or more processors to determine a target copy partition corresponding to the retransmission request based at least in part on comparing respective partition response times of candidate copy partitions in the distributed cluster, wherein the second apparatus determines a target copy partition by:
        accumulating partition response speed information of a subset of the plurality of candidate copy partitions until a ratio between an accumulated sum of the subset of the plurality of candidate copy partitions and a sum of partition response speed information of the plurality of candidate copy partitions is greater than a random number, and
        setting a last candidate copy partition of the subset of the plurality of candidate copy partitions as the target copy partition corresponding to the retransmission request; and
    a third apparatus stored in the memory and executable by the one or more processors to transmit the retransmission request to the target copy partition.

10. The system of claim 9, wherein the third apparatus further detects whether the retransmission request satisfies a request retransmission condition, and transmits the retransmission request to the target copy partition in response to the retransmission request satisfying the request retransmission condition.

11. The system of claim 10, wherein the third apparatus determines whether the retransmission request satisfies the request retransmission condition based at least in part on a partition response time of the target copy partition and a maximum timeout time corresponding to the retransmission request.

12. The system of claim 10, further comprising a fourth apparatus to determine respective partition response speeds of the copy partitions based at least in part on respective past partition response times and/or respective current partition response times of the copy partitions, wherein the second apparatus determines the target copy partition corresponding to the retransmission request based on the respective partition response speeds of the copy partitions.

13. The system of claim 12, wherein the second apparatus further determines a plurality of candidate copy partitions according to the retransmission request, and determines the target copy partition corresponding to the retransmission request based on corresponding partition response speeds of the plurality of candidate copy partitions.

14. The system of claim 12, further comprising:
    a fifth apparatus to obtain an initial transmission request to be processed in the distributed cluster; and
    a sixth apparatus to determine a copy partition corresponding to the initial transmission request based at least in part on the respective partition response speeds of the copy partitions, and sends the initial transmission request to the copy partition corresponding to the initial transmission request.

15. The system of claim 12, further comprising:
    a seventh apparatus used to receive a response result corresponding to the retransmission request; and
    an eighth apparatus to determine request surplus time information of the target copy partition according to a response time of the response result and a request maximum timeout time of the target copy partition, and to update partition response speed information of the target copy partition based at least in part on the request surplus time information.

16. One or more computer-readable media storing executable instructions that, when executed by one or more processors, cause the one or more processors to perform acts comprising:
- obtaining a retransmission request of a computation task to be processed in a distributed cluster, the computation task relating to data having at least one data copy, the at least one data copy comprising a plurality of copy partitions;
- determining a target copy partition corresponding to the retransmission request based at least in part on comparing respective partition response times of candidate copy partitions in the distributed cluster, wherein determining the target copy partition comprises:
  - accumulating partition response speed information of a subset of the plurality of candidate copy partitions until a ratio between an accumulated sum of the subset of the plurality of candidate copy partitions and a sum of partition response speed information of the plurality of candidate copy partitions is greater than a random number; and
  - setting a last candidate copy partition of the subset of the plurality of candidate copy partitions as the target copy partition corresponding to the retransmission request; and
- sending the retransmission request to the target copy partition.

17. The one or more computer-readable media of claim 16, wherein sending the retransmission request to the target copy partition comprises:
- detecting whether the retransmission request satisfies a request retransmission condition; and
- sending the retransmission request to the target copy partition in response to the retransmission request satisfying the request retransmission condition.

18. The one or more computer-readable media of claim 16, the acts further comprising determining respective partition response speed information of the copy partitions based at least in part on respective past partition response times and/or respective current partition response times of the copy partitions, wherein determining the target copy partition comprises determining the target copy partition corresponding to the retransmission request based at least in part on the respective partition response speed information of the copy partitions.

* * * * *